(12) United States Patent
Yang et al.

(10) Patent No.: US 8,595,807 B2
(45) Date of Patent: Nov. 26, 2013

(54) METHOD, SYSTEM, AND DEVICE FOR IMPLEMENTING DEVICE ADDITION IN WI-FI DEVICE TO DEVICE NETWORK

(75) Inventors: Yongli Yang, Shenzhen (CN); Zhiming Ding, Shenzhen (CN); Guiming Shu, Shenzhen (CN); Xilei Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 153 days.

(21) Appl. No.: 13/108,606

(22) Filed: May 16, 2011

(65) Prior Publication Data

US 2011/0271334 A1    Nov. 3, 2011

Related U.S. Application Data

(63) Continuation of application No. PCT/CN2009/074667, filed on Oct. 28, 2009.

(30) Foreign Application Priority Data

Nov. 14, 2008 (CN) .......................... 2008 1 0180905

(51) Int. Cl.
*G06F 21/00* (2013.01)

(52) U.S. Cl.
USPC ........ 726/7; 726/17; 726/27; 726/28; 726/29; 726/30; 709/227; 709/228; 709/229; 709/230; 713/182; 713/183; 713/184; 713/185

(58) Field of Classification Search
USPC ...................... 726/7, 17, 27–30; 709/227–229
See application file for complete search history.

(56) References Cited

U.S. PATENT DOCUMENTS

2006/0041750 A1    2/2006    Carter et al.

2008/0037444 A1    2/2008    Chhabra (Continued)

FOREIGN PATENT DOCUMENTS

| CN | 1705245 A | 12/2005 |
|---|---|---|
| CN | 1722702 A | 1/2006 |
| CN | 101127625 A | 2/2008 |

OTHER PUBLICATIONS

Dimitris et. al., Enhancement WPS Security, 2012, IEEE.*

(Continued)

*Primary Examiner* — Taghi Arani
*Assistant Examiner* — Josnel Jeudy
(74) *Attorney, Agent, or Firm* — Brinks Gilson & Lione

(57) ABSTRACT

A method, a system, and a device for implementing device addition in a Wireless Fidelity (Wi-Fi) Device to Device (D2D) network are provided, which belong to the field of communication. The method includes: receiving, by a first D2D client device, a first add request message forwarded by a D2D master device, in which the first add request message carries an identifier of a new device to be added to the D2D network; receiving a first Personal Identification Number (PIN) code of the new device; and forwarding the received first PIN code to the D2D master device, in which the first PIN code of the new device is used for implementing that the D2D master device performs Wi-Fi Protected Setup (WPS) security configuration of the new device according to the first PIN code. Therefore, in the Wi-Fi D2D network, when a new device is to be added, a PIN code of the new device inputted by a user is received by the D2D client device, and the PIN code is forwarded to the D2D master device, so that the addition of the new device through the recommendation of the D2D client device is implemented, and the work continuity of the user using the D2D master device is ensured.

4 Claims, 8 Drawing Sheets

(56) References Cited

U.S. PATENT DOCUMENTS

2008/0240068 A1* 10/2008 Ishimoto ...................... 370/345
2009/0158402 A1    6/2009 Ding
2010/0312895 A1* 12/2010 Fujii ............................ 709/226

OTHER PUBLICATIONS

Office Action issued in corresponding Chinese Patent Application No. 200810180905.6, mailed Oct. 19, 2011.
Written Opinion of the International Searching Authority issued in corresponding PCT Patent Application No. PCT/CN2009/074667, mailed Feb. 4, 2010.
International Search Report issued in corresponding PCT Patent Application No. PCT/CN2009/074667, mailed Feb. 4, 2010.
Office Action issued in corresponding Chinese Patent Application No. 200810180905.6, mailed Jun. 26, 2012.
Office Action issued in corresponding Chinese Patent Application No. 200810180905.6, mailed Jan. 18, 2013.
Extended European Search Report issued in corresponding European Patent Application No. 09825753.8, mailed May 18, 2012.
Wi-Fi Alliance, "Wi-Fi Certified™ for Wi-Fi Protected Setup: Easing the User Experience for Home and Small Office Wi-Fi® Networks" 2007. XP55025949.
Wi-Fi Alliance, "Introducing Wi-Fi Protected Setup™" Jan. 3, 2007. XP-002515938.

* cited by examiner

METHOD, SYSTEM, AND DEVICE FOR IMPLEMENTING DEVICE ADDITION IN WI-FI DEVICE TO DEVICE NETWORK

CROSS-REFERENCE TO RELATED APPLICATIONS

This application is a continuation of International Application No. PCT/CN2009/074667, filed on Oct. 28, 2009, which claims priority to Chinese Patent Application No. 200810180905.6, filed on Nov. 14, 2008, both of which are hereby incorporated by reference in their entireties.

FIELD OF THE INVENTION

The present invention relates to the field of communication, and in particular, to a method, a system, and a device for implementing device addition in a Wireless Fidelity (Wi-Fi) Device to Device (D2D) network.

BACKGROUND OF THE INVENTION

With the development of communication technologies, the Wireless Fidelity (Wi-Fi) Alliance puts forward a Device to Device (D2D) networking mode based on Wi-Fi, in which the Wi-Fi D2D network may have networking modes of 1:1 and 1:n. Referring to FIG. 1, a schematic view of a networking mode of 1:1 in a Wi-Fi D2D network is provided; and referring to FIG. 2, a schematic view of a networking mode of 1:n in the Wi-Fi D2D network is provided. As shown in FIGS. 1 and 2, in the networking mode, the devices are divided into a master (D2D master device) and a client (D2D client device) according to their status. The function of the master device is similar to the function of an Access Point (AP) in an infrastructure network, and the master device has a function of having a built-in register for deciding whether to approve a new device's addition to the D2D network to become a client device; and the client device connected to the master device is similar to a subscriber station (STA) in the infrastructure network. When the client devices intend to communicate with each other, the communication needs to be relayed through the master device.

In the implementation of the present invention, the inventors find that in a Wi-Fi D2D network already having several devices added to the network to become client devices, if a user using a master device is making a speech or doing other important work, when a new device requests addition, the user needs to input a Personal Identification Number (PIN) code of the new device into the master device, and the authentication and approval of the master device is required before the new device can be added. At this time, the user using the master device has to interrupt the ongoing work to deal with the operation of inputting the PIN code of the new device to be added. As a result, the normal work of the user is interrupted. Especially when new devices request addition continuously, the normal work of the user is interrupted frequently, and the user experience is degraded.

SUMMARY OF THE INVENTION

In order to ensure work continuity of a user using a D2D master device when a new device is to be added in a Wi-Fi D2D network, the present invention is directed to a method, a system, and a device for implementing device addition in a Wi-Fi D2D network. The technical solutions are as follows.

An embodiment of the present invention provides a method for implementing device addition in a Wi-Fi D2D network, where the method includes:

receiving, by a first D2D client device, a first add request message forwarded by a D2D master device, in which the first add request message carries an identifier of a new device to be added to the D2D network;

receiving a first PIN code of the new device; and forwarding the received first PIN code to the D2D master device, in which the first PIN code of the new device is used for implementing that the D2D master device performs Wi-Fi Protected Setup (WPS) security configuration of the new device according to the first PIN code.

An embodiment of the present invention further provides a network system, where the network system includes a new device, a D2D master device, and a first D2D client device.

The new device is configured to send a first add request message to the D2D master device, in which the first add request message carries an identifier of the new device; and perform WPS security configuration with the D2D master device according to a first PIN code of the new device.

The D2D master device is configured to receive the first add request message, and forward the first request message to the first D2D client device; receive the first PIN code of the new device forwarded by the first D2D client device; and perform WPS security configuration of the new device according to the received first PIN code of the new device.

The first D2D client device is configured to receive the first add request message forwarded by the D2D master device; and receive the first PIN code of the new device, and forward the first PIN code of the new device to the D2D master device.

An embodiment of the present invention further provides a D2D master device, where the D2D master device includes:

a receiving module, configured to receive a first add request message carrying an identifier of a new device that is sent by the new device; and receive a first PIN code of the new device forwarded by a first D2D client device;

a forwarding module, configured to forward the first add request message received by the receiving module to the first D2D client device; and a performing module, configured to perform WPS security configuration of the new device according to the first PIN code of the new device received by the receiving module.

The beneficial effect of the technical solutions provided by the embodiments of the present invention is as follows.

In a Wi-Fi D2D network already having several clients, when a new device requests addition to the network, the purpose of adding the new device to the network is achieved by inputting a PIN code of the new device into a client device that already belongs to the network and forwarding the PIN code of the new device by the client device without participation of a user of a master device, so as to effectively avoid interruption of work of the user using the master device, ensure work continuity of the user, improve user experience, and enhance the satisfaction degree of the user.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are just some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the embodiments of the present invention will be described in detail below with reference to the accompanying drawings.

In order to ensure work continuity of a user using a master device when a new device is to be added in a Wi-Fi D2D network, an embodiment of the present invention provides a method for implementing device addition in a D2D network. The method includes:

receiving, by a first D2D client device, a first add request message forwarded by a D2D master device, in which the first add request message carries an identifier of a new device to be added to the D2D network;

receiving a first PIN code of the new device; and forwarding the received first PIN code to the D2D master device, in which the first PIN code of the new device is used for implementing that the D2D master device performs WPS security configuration of the new device according to the first PIN code.

Furthermore, in order to improve security and reliability of the new device, the method further includes:

receiving, by a second D2D client device, a second add request message forwarded by the D2D master device, in which the second add request message carries the identifier of the new device and an indicator, and the indicator is configured to indicate that the second add request message is to request enhancement of a security level;

receiving a second PIN code of the new device; and forwarding the received second PIN code to the D2D master device, in which the D2D master device performs WPS security configuration of the new device according to the first PIN code and the second PIN code of the new device.

According to the method provided by the embodiment of the present invention, in the Wi-Fi D2D network, when a new device is to be added, the work continuity of the user using the D2D master device is ensured, and the security and reliability of the new device can be further improved. In order to describe the method provided by the embodiment of the present invention in detail, reference is made to the following embodiments.

Embodiment 1

Figure 1:
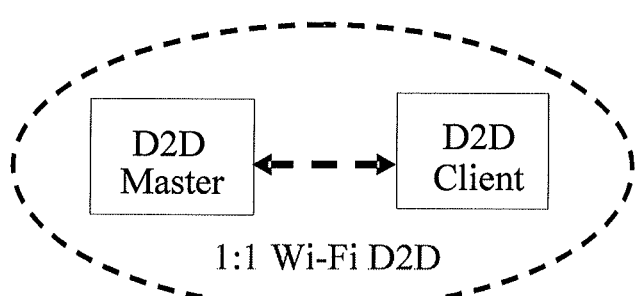
FIG. 1 is a schematic view of a networking mode of 1:1 in a Wi-Fi D2D network according to the prior art.
Figure 2:
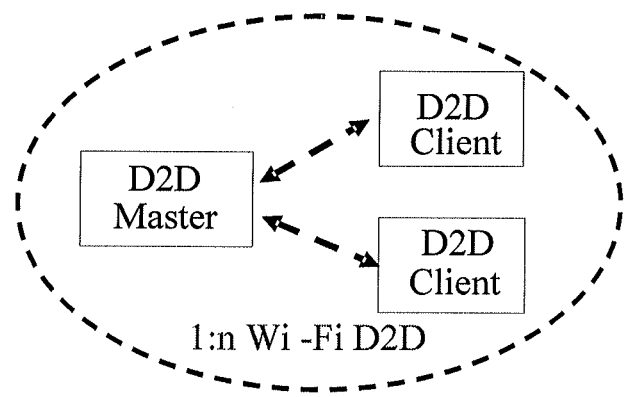
FIG. 2 is a schematic view of a networking mode of 1:n in a Wi-Fi D2D network according to the prior art.
Figure 3:
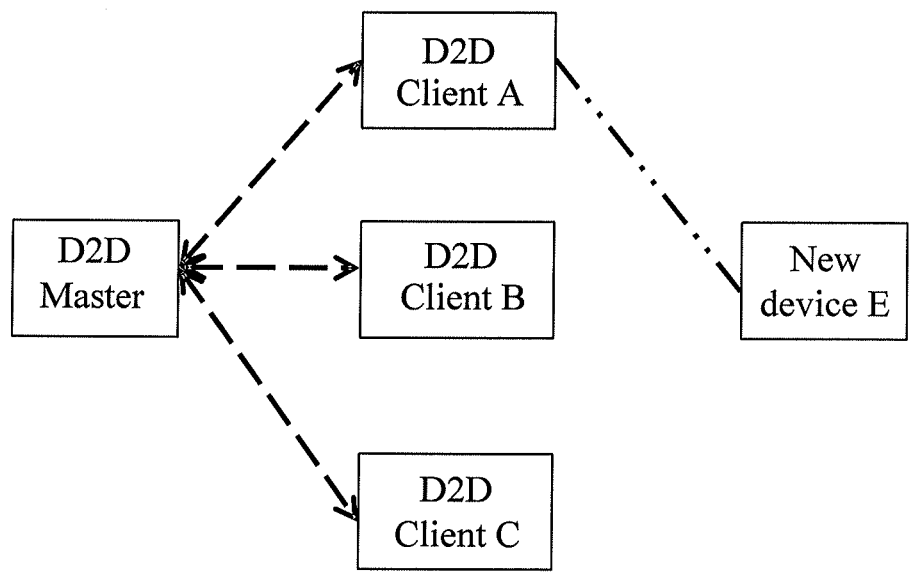
FIG. 3 is a schematic view of implementing device addition in a Wi-Fi D2D network according to Embodiment 1 of the present invention.

An embodiment of the present invention provides a method for implementing device addition in a Wi-Fi D2D network, so as to describe the method provided by the embodiment of the present invention in detail. Referring to FIG. 3, a schematic view of implementing device addition in a D2D network provided by the embodiment of the present invention is shown. As shown in FIG. 3, in the D2D network with a networking mode of 1:n, three D2D client devices, namely, Client A, Client B, and Client C, already exist under a D2D master device. It is assumed that a user of the D2D master device is doing important work that the user does not wish to interrupt while a new device E wants to be added to the D2D network. In this embodiment, in order to distinguish the devices already added to the D2D network from the new device to be added to the D2D network, the already added devices are collectively referred to as client devices, while the device to be added is referred to as a new device to be added.

Figure 4:
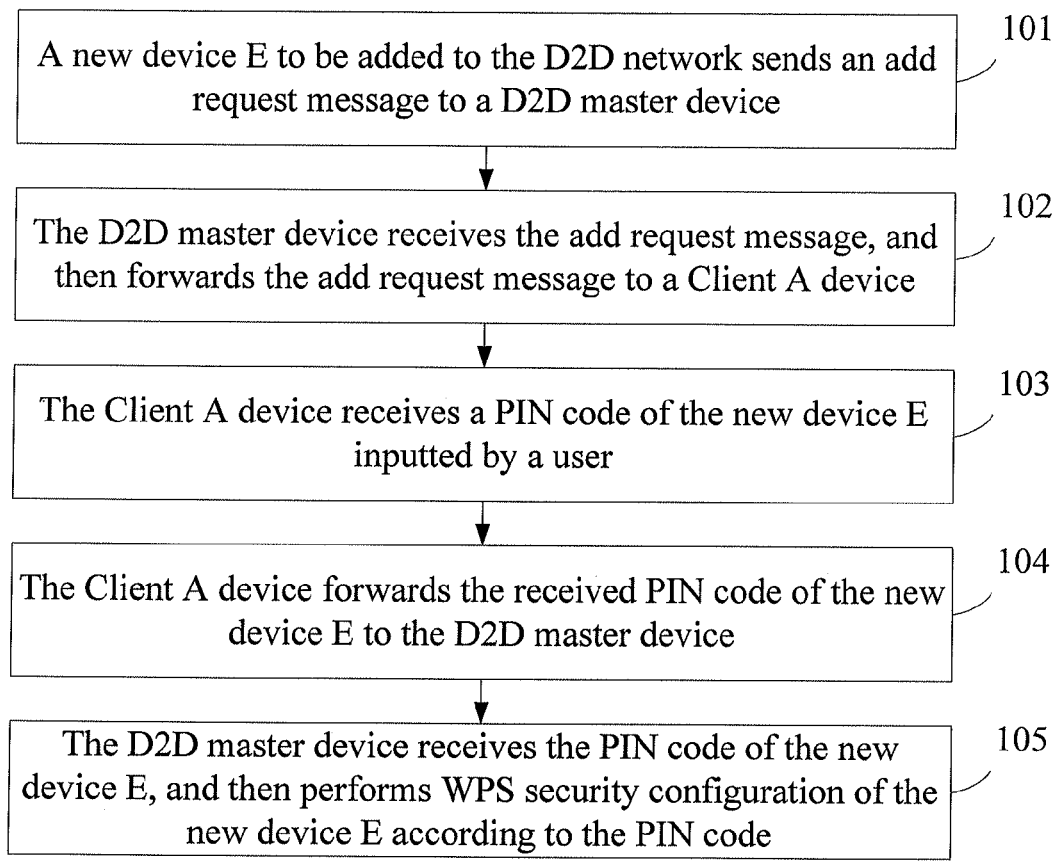
FIG. 4 is a schematic flow chart of a method for implementing device addition in a Wi-Fi D2D network according to Embodiment 1 of the present invention.

The application scenario provided in FIG. 3 is taken as an example to describe the method provided by the embodiment of the present invention. Referring to FIG. 4, the method includes the following steps.

In Step 101, a new device E to be added to the D2D network sends an add request message to a D2D master device, in which the add request message carries an identifier of the new device E.

The add request message may be specifically implemented through a probe request message, in which the add request message may further carry information such as a supported sending rate, a name of a network to which the device is to be added, and other self-defined content.

In Step 102, the D2D master device receives the add request message, and then forwards the add request message to a Client A device.

The specific implementation of Step 102 may include at least the following two modes.

Mode 1

The D2D master device uses a preset assignment rule to assign a client device in the client devices there-under to be a target device for forwarding the add request message. For example, when Mode 1 is used, in this embodiment, the D2D master device pre-assigns the Client A device to be the target device for forwarding the add request message.

Correspondingly, when Mode 1 is used, the user using the new device E needs to input beforehand a PIN code of the new device into the pre-assigned Client A device.

Mode 2

The D2D master device forwards the received add request message to the client devices there-under in a broadcast mode, and any client device receiving the add request message may perform the following steps. For example, when Mode 2 is used, in this embodiment, the D2D master device forwards by broadcast the add request message to Client A, Client B, and Client C, and the Client A device performing the following steps is taken as an example.

Correspondingly, when Mode 2 is used, the user using the new device E knows beforehand that the PIN code of the new device E may be arbitrarily inputted into the client devices, and correspondingly, in this embodiment, the user selecting to input the PIN code of the new device E into the Client A device is taken as an example for description.

In Step 103, the Client A device receives a PIN code of the new device E.

Usually, the PIN code is attached to the device in the form of a label, and a user inputs the PIN code into a register, so as to accomplish WPS security configuration. Furthermore, the PIN code of the new device E may be dynamically and randomly generated through a PIN code generation device. The user may be the user using the new device E, or the user using the Client A device, which is not limited in the embodiment of the present invention.

In Step 104, the Client A device forwards the received PIN code of the new device E to the D2D master device.

In Step 105, the D2D master device receives the PIN code of the new device E, and then performs WPS security configuration of the new device E according to the PIN code.

Figure 5:
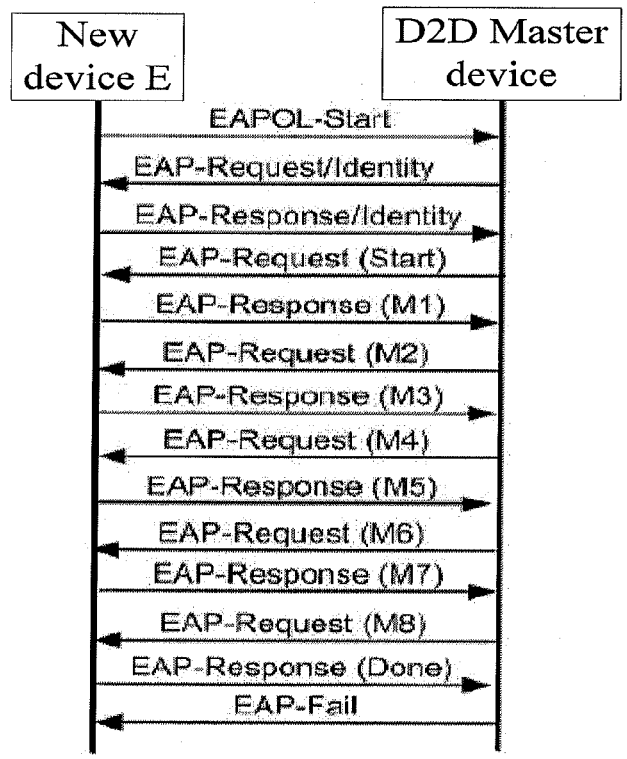
FIG. 5 is a schematic view illustrating interaction of a WPS security configuration process according to Embodiment 1 of the present invention.

The process that the D2D master device performs WPS of the new device E according to the PIN code is usually implemented by using an Extensible Authentication Protocol over Local Area Network (LAN) (EAPOL), that is, using a negotiation method of eight Extensible Authentication Protocol (EAP) messages M1 to M8. Referring to FIG. 5, a schematic view illustrating interaction of the WPS security configuration process provided by the embodiment of the present invention is shown, and the detailed description is as follows.

The negotiation method of eight EAP messages M1 to M8 is used. The M1 and M2 use a Diffie-Hellman (DH) algorithm to generate a public key at both devices. In the M3 to M7 messages, the new device E firstly synthesizes the PIN code thereof, a random number E-S, and the public key into a hash code E-Hash and sends the hash code E-Hash to the D2D master device; and then encrypts the random number E-S and sends it to the D2D master device again, and the D2D master device decrypts the received encrypted E-S through the PIN code of the new device E and the public key obtained and reconstructs the E-Hash. On the contrary, similarly, the D2D master device sends R-Hash to the new device E with a similar method and the new device E reconstructs R-Hash. As long as it is found that the reconstructed Hash is inconsistent with the previously received Hash in the process of message interaction, the negotiation process is interrupted. Furthermore, each message authenticates through a Hash-based Message Authentication Code (HMAC) function whether the previously received message is tampered, and each message is sent on the basis of successful authentication of the previously received message. Finally, the D2D master device confers credential of subsequent Internet connection to the new device E in the M8 message.

The secure discovery between the new device E and the D2D master device is implemented through the WPS security configuration, and it is ensured that the new device E obtains the key from the D2D master device securely. As the WPS security configuration process belongs to the prior art, the process is described without more details.

Figure 6:
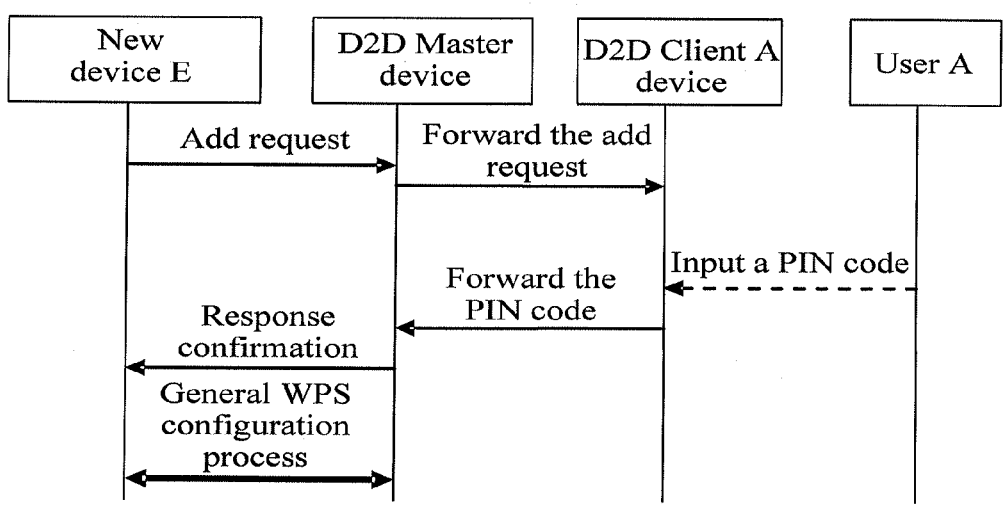
FIG. 6 is a schematic view illustrating information interaction of the method according to Embodiment 1 of the present invention.

Referring to FIG. 6, a schematic view illustrating information interaction of the method provided by the embodiment of the present invention is shown. Based on the above, according to the method provided by the embodiment of the present invention, in a Wi-Fi D2D network already having several clients, when a new device requests addition to the network, the purpose of adding the new device to the network is achieved by inputting a PIN code of the new device into a client device that already belongs to the network and forwarding the PIN code of the new device by the client device without participation of a user of a master device, so as to effectively avoid interruption of work of the user using the master device, ensure work continuity of the user, improve user experience, and enhance the satisfaction degree of the user.

Furthermore, in order to further improve the security and reliability of communication of the new device E to be added to the network, and prevent the Client A device from eavesdropping on the communication between the new device E and the master device, referring to Embodiment 2, a method for implementing device addition in a D2D network is provided, and the detailed description is as follows.

Embodiment 2

An embodiment of the present invention provides a method for implementing device addition in a D2D network, in which the network application scenario provided in FIG. 3 is still taken as an example for description.

In order to improve the security and reliability of communication of the new device E to be added to the network, according to the method provided by this embodiment, Steps 101 to 105 of the method provided by Embodiment 1 may be repeated for the new device E by means of Client B, except that a PIN code inputted again into Client B is different from the PIN code in Step 105. Correspondingly, the master device uses the PIN codes inputted twice to obtain by combination a new digital sequence N according to a preset algorithm, the new device E uses the same algorithm to calculate the sequence N, and then the new device E and the master device perform a general WPS security configuration process by means of the newly generated digital sequence N, so as to prevent Client A and Client B from eavesdropping on the communication between the new device E and the master device, and improve the security and reliability of communication of the new device E to be added to the network, and the details are as follows.

Figure 7:
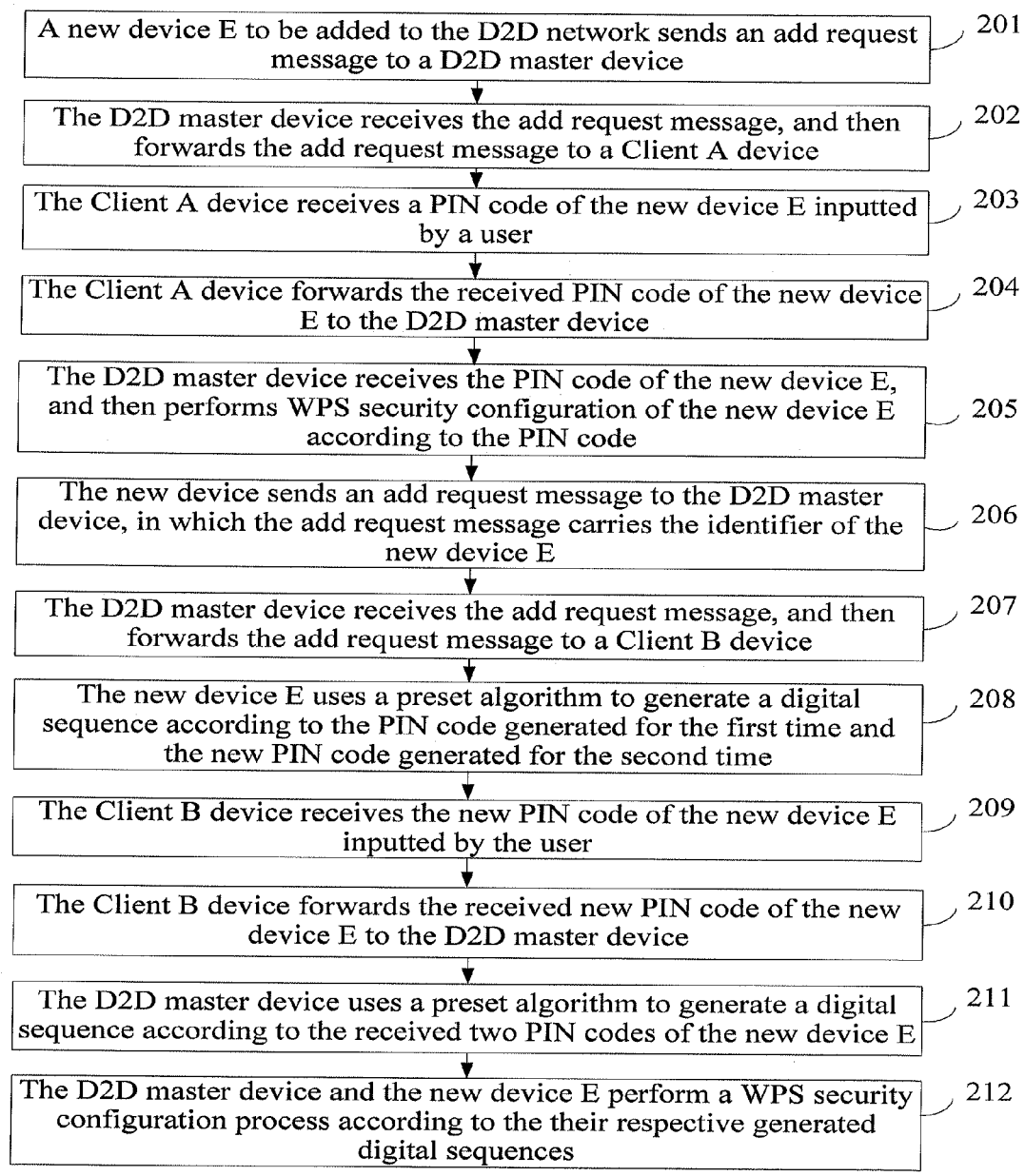
FIG. 7 is a schematic flow chart of a method for implementing device addition in a Wi-Fi D2D network according to Embodiment 2 of the present invention.

Referring to FIG. 7, a schematic flow chart of the method for implementing device addition in the D2D network provided by the embodiment of the present invention is shown, which includes the following steps.

In Step 201, a new device E to be added to the D2D network sends an add request message to a D2D master device, in which the add request message carries an identifier of the new device E.

In Step 202, the D2D master device receives the add request message, and then forwards the add request message to a Client A device.

In Step 203, the Client A device receives a PIN code of the new device E inputted by a user.

The user may be a user using the new device E, or a user using the Client A device, which is not limited in the embodiment of the present invention.

In Step 204, the Client A device forwards the received PIN code of the new device E to the D2D master device.

In Step 205, the D2D master device receives the PIN code of the new device E, and then performs WPS security configuration of the new device E according to the PIN code.

When Step 205 is finished, if the user using the new device E wants to improve the security and reliability of the communication of the new device E, the following steps need to be performed.

In Step 206, the new device E sends an add request message to the D2D master device, in which the add request message carries the identifier of the new device E and an indicator.

The indicator is configured to indicate that the add request message carrying the indicator is to request enhancement of a security level. For differentiation, the add request message involved before Step 206 is referred to as a first add request message, and correspondingly, the add request message involved in Step 206 is referred to as a second add request message.

In Step 207, the D2D master device receives the add request message, and then forwards the add request message to a Client B device.

The selection of the Client B device by the D2D master device may be made by pre-assignment or broadcast similarly to Embodiment 1. The embodiment of the present invention does not limit the specific mode and method of selecting the Client B device, as long as it is ensured that the client device selected this time is different from the client device selected last time.

In Step 208, the new device E uses a preset algorithm to generate a digital sequence according to the PIN code generated for the first time and the new PIN code generated for the second time.

In order to implement the method provided by this embodiment, the new device E is required to have at least two different PIN codes. The embodiment of the present invention does not limit the mode and method of generating the PIN code of the new device E, for example, the PIN code of the new device E may be dynamically and randomly generated, as long as it is ensured that the PIN codes generated twice are different. For differentiation, the PIN code generated for the first time is referred to as a first PIN code, and correspondingly, the PIN code generated for the second time is referred to as a second PIN code.

As for the specific implementation of Step 208 in which the new device E uses the preset algorithm to generate the digital sequence according to the PIN code generated for the first time and the new PIN code generated for the second time, the digital sequence may be obtained in the following manner. For example, the PIN code generated for the first time is PIN1: 2576, the PIN code generated for the second time is PIN2: 4681, and the preset algorithm of the digital sequence is: adding corresponding digits of the two PIN codes and taking single digits; therefore, correspondingly, the two PIN codes are added and then single digits are taken to obtain 6157, that is, the digital sequence.

In Step 209, the Client B device receives the new PIN code of the new device E inputted by the user.

The user may be the user using the new device E, or the user using the Client A device, which is not limited in the embodiment of the present invention.

In Step 210, the Client B device forwards the received new PIN code of the new device E to the D2D master device.

In Step 211, the D2D master device uses a preset algorithm to generate a digital sequence according to the received two PIN codes of the new device E.

It should be ensured that the preset algorithm for generating the digital sequence in the D2D master device is the same as the preset algorithm for generating the digital sequence in the new device E.

In Step 212, the D2D master device and the new device E perform a WPS security configuration process according to their respective generated digital sequences.

The process that the D2D master device performs WPS security configuration of the new device E according to the digital sequence is also implemented by using an EAPOL, that is, using a negotiation method of eight EAP messages M1 to M8, except that the previous interaction in the WPS security configuration process based on the PIN code is changed to based on the newly generated digital sequence, and the details are described as follows.

The process that the D2D master device performs WPS security configuration of the new device E according to the digital sequence uses the negotiation method of eight EAP messages M1 to M8. The M1 and M2 use a DH algorithm to generate a public key at both devices. In the M3 to M7 messages, the new device E firstly synthesizes the digital sequence generated by itself, a random number E-S, and the public key into a hash code E-Hash and sends the hash code E-Hash to the D2D master device; and then encrypts the random number E-S and sends it to the D2D master device again, and the D2D master device decrypts the received encrypted E-S through the digital sequence generated by itself and the public key, and reconstructs the E-Hash. On the contrary, similarly, the D2D master device sends R-Hash to the new device E with a similar method and the new device E reconstructs R-Hash. As long as it is found that the reconstructed Hash is inconsistent with the previously received Hash in the process of message interaction, the negotiation process is interrupted. Furthermore, each message authenticates through an HMAC function whether the previously received message is tampered, and each message is sent on the basis of successful authentication of the previously received message. Finally, the D2D master device confers credential of subsequent Internet connection to the new device E in the M8 message.

Figure 8:
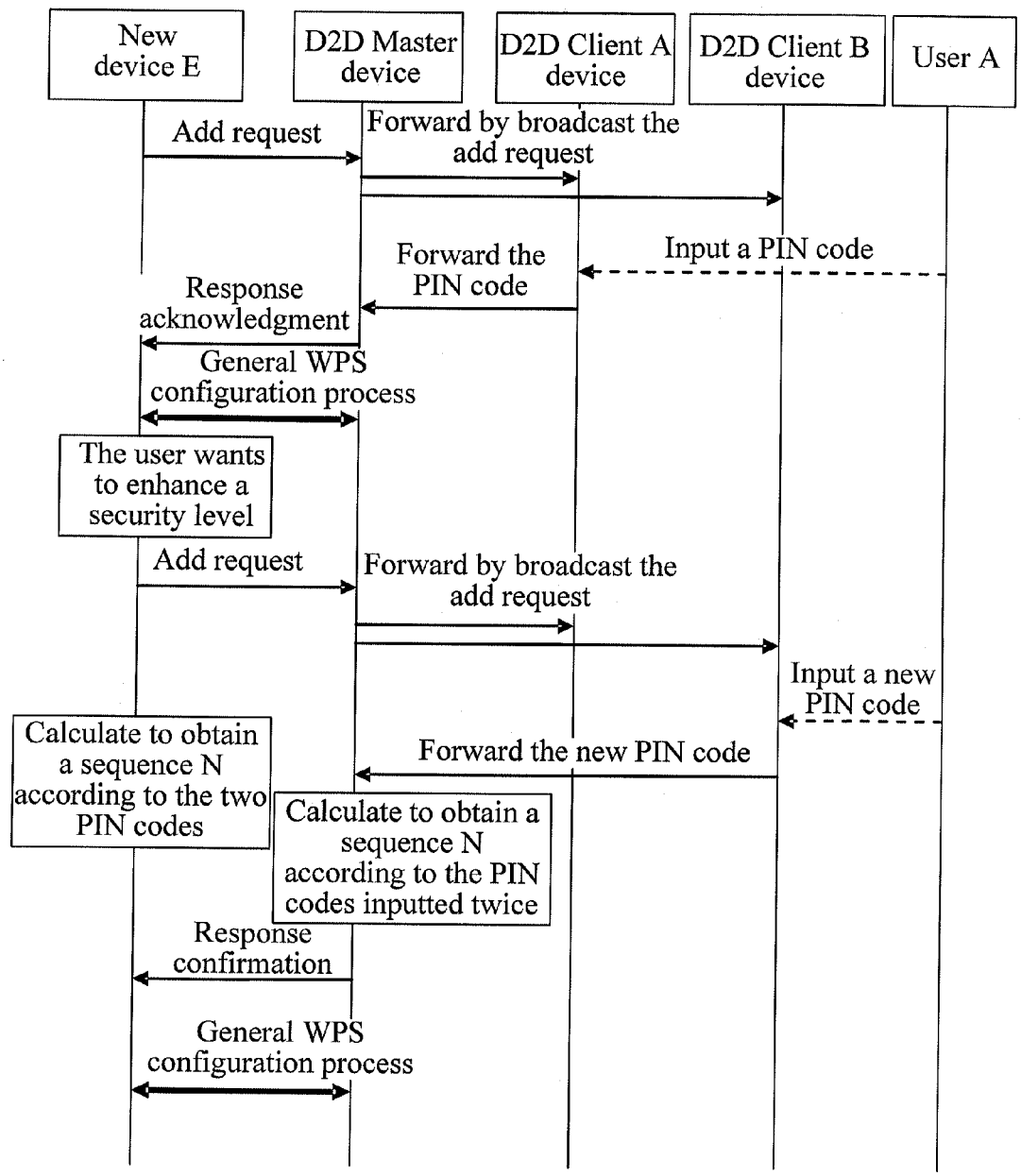
FIG. 8 is a schematic view illustrating information interaction of the method according to Embodiment 2 of the present invention.

Referring to FIG. 8, a schematic view illustrating information interaction of the method provided by the embodiment of the present invention is shown. Based on the above, according to the method provided by the embodiment of the present invention, in a Wi-Fi D2D network already having several clients, when a new device requests addition to the network, the purpose of adding the new device to the network is achieved by inputting a PIN code of the new device into a client device that already belongs to the network and forwarding the PIN code of the new device by the client device without participation of a user of a master device, so as to effectively avoid interruption of work of the user using the master device, ensure work continuity of the user, improve user experience, and enhance the satisfaction degree of the user. Furthermore, the security and reliability of communication of the new device E to be added to the network is further improved, and the Client A device is prevented from eavesdropping on the communication between the new device E and the master device.

Embodiment 3

Figure 9:
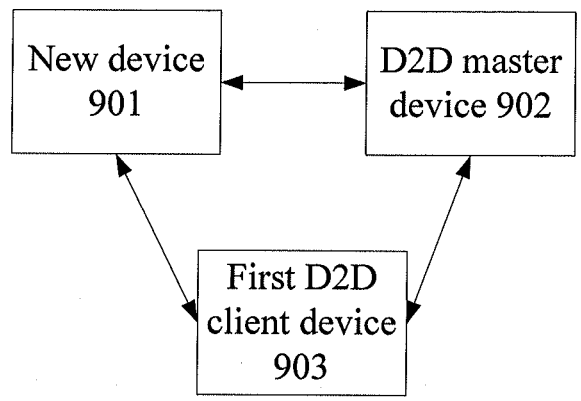
FIG. 9 is a schematic view of a network system according to Embodiment 3 of the present invention.

Referring to FIG. 9, an embodiment of the present invention provides a network system, which includes a new device 901, a D2D master device 902, and a first D2D client device 903.

The new device 901 is configured to send a first add request message to the D2D master device 902, in which the first add request message carries an identifier of the new device 901; and perform WPS security configuration with the D2D master device 902 according to a first PIN code of the new device 901.

The D2D master device 902 is configured to receive the first add request message, and forward the first request message to the first D2D client device 903; receive the first PIN code of the new device 901 forwarded by the first D2D client device 903; and perform WPS security configuration of the new device 901 according to the received first PIN code of the new device 901.

The first D2D client device 903 is configured to receive the first add request message forwarded by the D2D master device 902; and receive the first PIN code of the new device 901 and forward the first PIN code of the new device 901 to the D2D master device 902.

Figure 10:
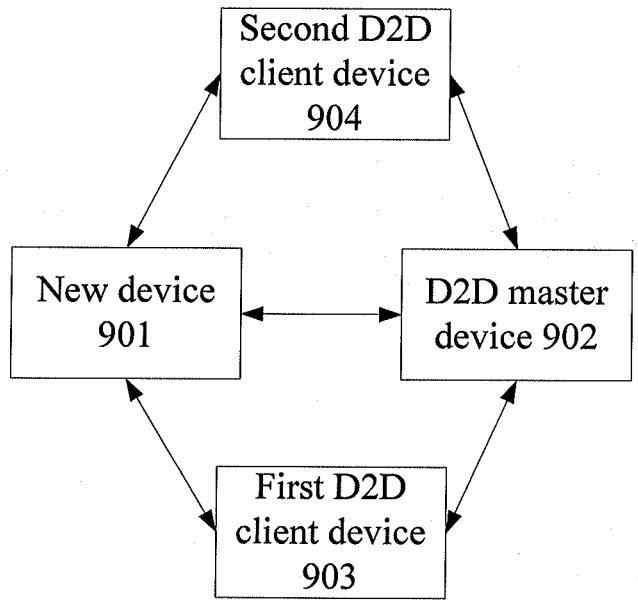
FIG. 10 is another schematic view of the network system according to Embodiment 3 of the present invention.

Furthermore, in order to improve security and reliability of communication of the new device 901 to be added to the network, and prevent the first D2D client device 903 from eavesdropping on the communication between the new device 901 and the D2D master device 902, referring to FIG. 10, the system provided by the embodiment of the present invention further includes a second D2D client device 904.

The second D2D client device 904 is configured to receive a second add request message forwarded by the D2D master device 902; and receive a second PIN code of the new device 901, and forward the second PIN code to the D2D master device 902.

Correspondingly, the D2D master device 902 is further configured to receive the second add request message, and forward the second add request message to the second D2D client device 904; receive the second PIN code of the new device 901 forwarded by the second D2D client device 904; and perform WPS security configuration of the new device 901 according to the received first PIN code and second PIN code of the new device 901 (for example, generate a digital sequence according to the received first PIN code and second PIN code of the new device, in which the digital sequence is configured to perform WPS security configuration of the new device).

Correspondingly, the new device 901 is further configured to send the second add request message to the D2D master device 902, in which the second add request message carries the identifier of the new device 901 and an indicator, in which the indicator is configured to indicate that the second add request message is to request enhancement of a security level; and perform WPS security configuration with the D2D master device 902 according to the first PIN code and the second PIN code of the new device 901 (for example, generate a digital sequence according to the first PIN code and the second PIN code of the new device 901, in which the digital sequence is configured to perform WPS security configuration of the new device).

Based on the above, according to the system provided by the embodiment of the present invention, in a Wi-Fi D2D network already having several clients, when a new device requests addition to the network, the purpose of adding the new device to the network is achieved by inputting a PIN code of the new device into a client device that already belongs to the network and forwarding the PIN code of the new device by the client device without participation of a user of a master device, so as to effectively avoid interruption of work of the user using the master device, ensure work continuity of the user, improve user experience, and enhance the satisfaction degree of the user. Furthermore, the security and reliability of communication of the new device E to be added to the network is further improved, and the client device is prevented from eavesdropping on the communication between the new device and the master device.

Embodiment 4

Figure 11:
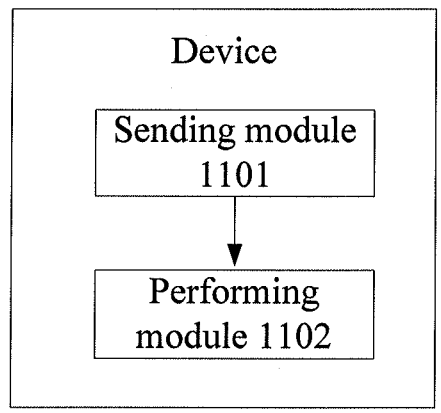
FIG. 11 is a schematic view of a device according to Embodiment 4 of the present invention.

Referring to FIG. 11, an embodiment of the present invention provides a device, which includes a sending module 1101 and a performing module 1102.

The sending module 1101 is configured to send a first add request message to a D2D master device, in which the first add request message carries an identifier of the device, and the first add request message is forwarded by the D2D master device to a first D2D client device.

The performing module 1102 is configured to perform WPS security configuration with the D2D master device according to a first PIN code of the device.

Furthermore, in order to improve security and reliability of communication of the device, and prevent the first D2D client device from eavesdropping on the communication between the device and the D2D master device, the sending module 1101 of the device provided by the embodiment of the present invention is further configured to send a second add request message to the D2D master device, in which the second add request message carries the identifier of the device and an indicator, the indicator is configured to indicate that the second add request message is to request enhancement of a security level, and the second add request message is forwarded by the D2D master device to a second client device.

Correspondingly, the device further includes a PIN code generation module.

The PIN code generation module is configured to dynamically generate a second PIN code of the device.

The performing module 1102 is further configured to generate a digital sequence according to the first PIN code and the second PIN code of the device, in which the digital sequence is configured to perform WPS security configuration by the D2D master device.

Based on the above, according to the device provided by the embodiment of the present invention, in a Wi-Fi D2D network already having several D2D client devices, when the device requests addition to the network, the purpose of adding the device to the network is achieved by inputting a PIN code of the device into a first D2D client device that already belongs to the network and forwarding the PIN code of the device by the first D2D client device without participation of a user of a D2D master device, so as to effectively avoid interruption of work of the user using the D2D master device, ensure work continuity of the user, improve user experience, and enhance the satisfaction degree of the user. Furthermore, by inputting another PIN code of the device into a second D2D client device, the security and reliability of communication of the device to be added to the network is further improved, and the first D2D client device is prevented from eavesdropping on the communication between the new device and the D2D master device.

Embodiment 5

Figure 12:
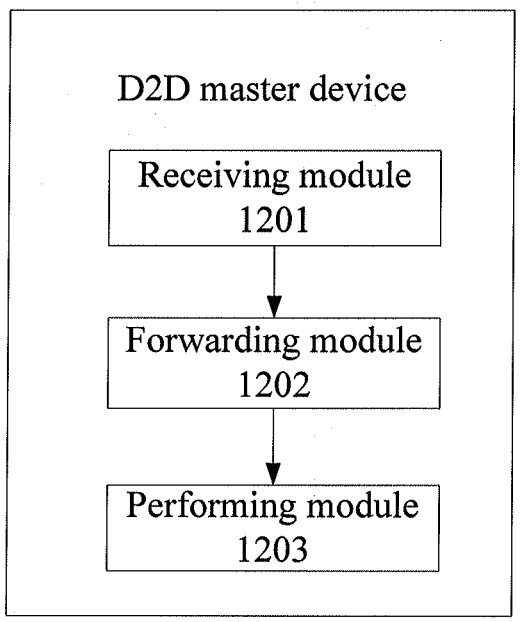
FIG. 12 is a schematic view of a D2D master device according to Embodiment 5 of the present invention.

Referring to FIG. 12, an embodiment of the present invention provides a D2D master device, which includes a receiving module 1201, a forwarding module 1202, and a performing module 1203.

The receiving module 1201 is configured to receive a first add request message carrying an identifier of a new device that is sent by the new device; and receive a first PIN code of the new device forwarded by a first D2D client device.

The forwarding module 1202 is configured to forward the first add request message received by the receiving module 1201 to the first D2D client device.

The performing module 1203 is configured to perform WPS security configuration of the new device according to the first PIN code of the new device received by the receiving module 1201.

Furthermore, in order to improve security and reliability of communication of the new device to be added to the network, and prevent the D2D client device from eavesdropping on the communication between the new device and the master device, the receiving module 1201 of the D2D master device provided by the embodiment of the present invention is further configured to receive a second add request message carrying the identifier of the new device and an indicator that is sent by the new device, in which the indicator is configured to indicate that the second add request message is to request enhancement of a security level; and receive a second PIN code of the new device forwarded by a second D2D client device.

The forwarding module 1202 is further configured to forward the second add request message received by the receiving module 1201 to the second D2D client device.

The performing module 1203 is further configured to generate a digital sequence according to the first PIN code and the second PIN code of the new device received by the receiving module 1201, in which the digital sequence is configured to perform WPS security configuration of the new device.

Based on the above, according to the D2D master device provided by the embodiment of the present invention, in a Wi-Fi D2D network already having several D2D client devices, when the device requests addition to the network, the purpose of adding the new device to the network is achieved by inputting a PIN code of the new device into a first D2D client device that already belongs to the network and forwarding the PIN code of the new device by the first D2D client device without participation of a user of the D2D master device, so as to effectively avoid interruption of work of the user using the D2D master device, ensure work continuity of the user, improve user experience, and enhance the satisfaction degree of the user. Furthermore, by inputting another PIN code of the new device into a second D2D client device, the security and reliability of communication of the new device to be added to the network is further improved, and the first D2D client device is prevented from eavesdropping on the communication between the new device and the D2D master device.

Embodiment 6

Figure 13:
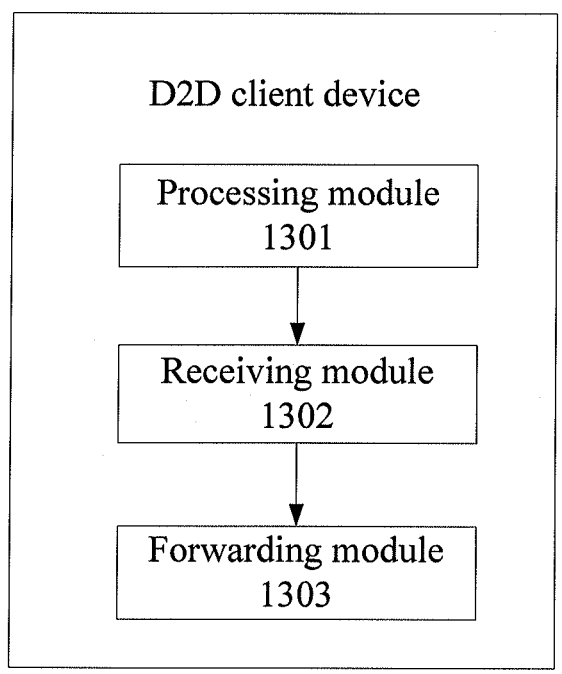
FIG. 13 is a schematic view of a D2D client device according to Embodiment 6 of the present invention.

Referring to FIG. 13, an embodiment of the present invention provides a D2D client device, which includes a processing module 1301, a receiving module 1302, and a forwarding module 1303.

The processing module 1301 is configured to receive an add request message forwarded by a D2D master device.

The receiving module 1302 is configured to receive a PIN code of a new device.

The forwarding module 1303 is configured to forward the PIN code of the new device received by the receiving module 1302 to the D2D master device.

Based on the above, according to the D2D client device provided by the embodiment of the present invention, in a Wi-Fi D2D network already having several D2D client devices, when the device requests addition to the network, the purpose of adding the new device to the network is achieved by inputting a PIN code of the new device into a D2D client device that already belongs to the network and forwarding the PIN code of the new device by the D2D client device without participation of a user of a D2D master device, so as to effectively avoid interruption of work of the user using the master device, ensure work continuity of the user, improve user experience, and enhance the satisfaction degree of the user.

Based on the above, according to the technical solutions provided by the embodiments of the present invention, other devices are added into a D2D network through recommendation of a client already in the network, so that it is not necessary to frequently interrupt work of a user of a D2D master device, and a new device is added more conveniently. Furthermore, through a method of inputting different PIN codes into different client devices twice, a master uses the PIN codes inputted twice to obtain by combination a new digital sequence N according to a certain algorithm, and the new device also uses the same algorithm to calculate the sequence N. Then, the master and the new device perform a general WPS security configuration process by means of the newly generated digital sequence N, which eliminates the possibility that the communication process is eavesdropped on by a certain client to which the PIN code is inputted, so as to ensure the security and reliability of communication.

The above descriptions are merely preferred embodiments of the present invention, but are not intended to limit the present invention. Any modification, equivalent replacement, or improvement made without departing from the spirit and principle of the present invention should fall within the scope of the present invention.

In the embodiments of the present invention, the term "receive" may be either construed as actively acquiring information from other modules, or construed as receiving information sent by other modules.

It should be understood by persons skilled in the art that the accompanying drawings are merely schematic views of preferred embodiments, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

The sequence numbers of the above embodiments of the present invention are merely for the convenience of description, and do not imply the preference among the embodiments.

A part of steps in the embodiments of the present invention may be implemented through software, and the corresponding software program may be stored in a readable storage medium such as an optical disk or a hard disk.

What is claimed is:

1. A method for adding a new device to a Wireless Fidelity (Wi-Fi) Device to Device (D2D) network, comprising:
    receiving, by a first D2D client device, a first add request message forwarded by a D2D master device, wherein the first add request message carries an identifier of the new device;
    receiving, by the first D2D client device, a first Personal Identification Number (PIN) code of the new device; and
    forwarding, by the first D2D client device, the received first PIN code of the new device to the D2D master device, wherein the first PIN code of the new device is used for implementing that the D2D master device performs Wi-Fi Protected Setup (WPS) security configuration of the new device according to the first PIN code,
    receiving, by a second D2D client device, a second add request message forwarded by the D2D master device, wherein the second add request message carries the identifier of the new device and an indicator, and the indicator is configured to indicate that the second add request message is requesting enhancement of a security level;
    receiving a second PIN code of the new device, wherein the second PIN code is different from the first PIN code; and forwarding, by the second D2D client device, the received second PIN code to the D2D master device, wherein the D2D master device performs the WPS security configuration of the new device according to the first PIN code and the second PIN code of the new device, wherein the performing the WPS security configuration of the new device according to the first PIN code and the second PIN code of the new device comprises:

generating, by the new device, a digital sequence by using the first PIN code and the second PIN code according to a preset algorithm;

generating, by the D2D master device, the digital sequence by using the preset algorithm; and performing, by the D2D master device and the new device, the WPS security configuration based on the generated digital sequence.

2. A network system, comprising: a new device, a Device to Device (D2D) master device, and a first D2D client device, wherein the new device includes:

a sending device configured to send a first add request message to the D2D master device, wherein the first add request message carries an identifier of the new device;

a first processor configured to perform Wireless Fidelity (Wi-Fi) Protected Setup (WPS) security configuration with the D2D master device according to a first Personal Identification Number (PIN) code of the new device;

wherein the D2D master device includes:

a first receiver configured to receive the first add request message and the first PIN code of the new device forwarded by the first D2D client device;

a first forwarding device configured to forward the first request message to the first D2D client device;

a second processor configured to perform the WPS security configuration of the new device according to the received first PIN code of the new device; and wherein the first D2D client device includes:

a second receiver configured to receive the first add request message forwarded by the D2D master device and receive the first PIN code of the new device; and a second forwarding device configured to forward the first PIN code of the new device to the D2D master device;

wherein the sending device is further configured to send a second add request message to the D2D master device, wherein the second add request message carries the identifier of the device and an indicator, and the indicator is configured to indicate that the second add request message is requesting enhancement of a security level, and the second add request message is forwarded by the D2D master device to a second D2D client device;

the new device further comprises:

a PIN code generator, configured to dynamically generate a second PIN code of the device; and the first processor is further configured to generate a digital sequence according to the first PIN code and the second PIN code of the device, wherein the digital sequence is configured to perform the WPS security configuration by the D2D master device.

3. A network system, comprising: a new device, a Device to Device (D2D) master device, and a first D2D client device, wherein the new device includes:

a sending device configured to send a first add request message to the D2D master device, wherein the first add request message carries an identifier of the new device;

a first processor configured to perform Wireless Fidelity (Wi-Fi) Protected Setup (WPS) security configuration with the D2D master device according to a first Personal Identification Number (PIN) code of the new device;

wherein the D2D master device includes:

a first receiver configured to receive the first add request message and the first PIN code of the new device forwarded by the first D2D client device;

a first forwarding device configured to forward the first request message to the first D2D client device;

a second processor configured to perform the WPS security configuration of the new device according to the received first PIN code of the new device; and wherein the first D2D client device includes:

a second receiver configured to receive the first add request message forwarded by the D2D master device and receive the first PIN code of the new device; and a second forwarding device configured to forward the first PIN code of the new device to the D2D master device;

wherein the first receiver is further configured to receive a second add request message carrying the identifier of the new device and an indicator that is sent by the new device, wherein the indicator is configured to indicate that the second add request message is requesting enhancement of a security level; and receive a second PIN code of the new device forwarded by a second D2D client device;

the first forwarding device is further configured to forward the second add request message received by the receiving module to the second D2D client device; and the second processor is further configured to generate a digital sequence according to the first PIN code and the second PIN code of the new device received by the receiving module, wherein the digital sequence is configured to perform the WPS security configuration of the new device.

4. A Device to Device (D2D) master device, comprising:

a receiver, configured to receive a first add request message carrying an identifier of a new device that is sent by the new device; and receive a first Personal Identification Number (PIN) code of the new device forwarded by a first D2D client device;

a forwarding device, configured to forward the first add request message received by the receiving module to the first D2D client device; and a processor, configured to perform Wireless Fidelity (Wi-Fi) Protected Setup (WPS) security configuration of the new device according to the first PIN code of the new device received by the receiving module;

wherein the receiver is further configured to receive a second add request message carrying the identifier of the new device and an indicator that is sent by the new device, wherein the indicator is configured to indicate that the second add request message is requesting enhancement of a security level; and receive a second PIN code of the new device forwarded by a second D2D client device;

the forwarding device is further configured to forward the second add request message received by the receiving module to the second D2D client device; and the processor is further configured to generate a digital sequence according to the first PIN code and the second PIN code of the new device received by the receiving module, wherein the digital sequence is configured to perform the WPS security configuration of the new device.

* * * * *